United States Patent Office 3,332,910
Patented July 25, 1967

3,332,910
MERCURIC OXIDE AS PROMOTER IN THE IODINE CATALYZED FORMATION OF POLYPHENYLENE ETHERS
John P. Mudde, Grosse Ile, Mich., assignor to The General Tire & Rubber Company, Akron, Ohio, a corporation of Ohio
No Drawing. Filed Oct. 16, 1964, Ser. No. 404,512
6 Claims. (Cl. 260—47)

ABSTRACT OF THE DISCLOSURE

Hydrocarbon substituted polyphenylene ethers are produced by polymerizing, in the presence of iodine as a catalyst and mercuric oxide as a promoter, substituted phenols of the general formula:

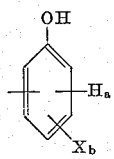

where X is a substituent selected from the group consisting of chloro, bromo and iodo radicals, H is a hydrogen radical substituted only on the meta positions relative to the OH radical, R is a monovalent hydrocarbon radical which when substituted in the two ortho positions relative to the OH radical must have one of said hydrocarbon radicals attached to the benzene ring by a carbon atom which is bonded to at least two hydrogen atoms, $a$ equals a number from 1 to 2, $b$ equals a number from 1 to 3, $c$ equals a number from 1 to 3, and the sum of $a$, $b$, and $c$ equals 5. The resulting polymers have improved viscosities and can be used as coatings and adhesives for fabric, wood, paper, metal and glass substrates.

This invention relates to a new and useful method for preparing polymers from certain substituted phenols and particularly to an improved process of preparing polyphenylene ethers. More specifically, the present invention relates to an improved method for polymerizing halogenhydrocarbon substituted phenols to produce hydrocarbon substituted polyphenylene ethers having improved molecular weights.

Such polyphenylene ethers prepared by the use of iodine catalyst, alone, are known in the art. However, such polymers are of relatively low molecular weight as compared to the improved polymer of the present invention. The polymers, as herein demonstrated, show as much as a 75 percent improvement when polymerized according to the method of this invention.

Accordingly, it is an object of the present invention to provide an improved process for producing polyphenylene ethers.

In accordance with the present invention hydrocarbon substituted polyphenylene ethers having improved molecular weights are produced from certain halogen-hydrocarbon substituted phenol monomers by polymerizing such monomers in the presence of iodine catalyst and mercuric oxide as a polymerization promoter. It has been found that the combination of iodine and mercuric oxide provides greatly improved polymers.

The substituted phenols which are used in the improved method of the instant invention are of the general formula:

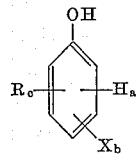

wherein R is a monovalent hydrocarbon radical, H is a hydrogen radical, X is a chloro, bromo or iodo radical and $a$ is a number having a value of 1 to 2, $b$ is a number having a value of 1 to 3, and $c$ is a number having a value of 1 to 3, the sum of $a$, $b$ and $c$ being equal to five.

The monovalent hydrocarbon radicals which R represents are, for example, alkyl radicals, such as methyl, ethyl, propyl, isopropyl, butyl, isobutyl, tert-butyl, pentyl, hexyl, heptyl, decyl, 2-ethyl hexyl, octadecyl, and the like; alkenyl radicals, such as vinyl, allyl, butenyl, hexenyl, octenyl, and the like; cycloalkyl radicals, such as cyclopropyl, cyclobutyl, cyclopentyl, and the like, cycloalkenyl radicals such as cyclopropenyl, cyclobutenyl, cyclopentenyl, cyclohexenyl and the like; aryl radicals, such as phenyl, naphthalyl, anthracyl, xenyl and the like; alkaryl radicals such as tolyl, xylyl, ethylphenyl, propyl phenyl and the like; aralkyl radicals, such as benzyl, tolylmethylene, tolylethylene, phenylethylene, phenyltrimethylene and the like.

When the monovalent hydrocarbon radicals are located on the benzene ring in the two positons ortho to the hydroxyl radical, one of the hydrocarbon radicals must be attached to the benzene ring by a carbon atom which is bonded to at least two hydrogen atoms. In other words, where there are two hydrocarbon radicals in the ortho positions to the OH radical, one must be bonded to the benzene ring by a primary carbon atom:

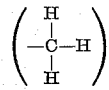

or a secondary carbon atom

The organic radical R has from 1 to 18 carbon atoms and preferably from 1 to 8 carbon atoms as a practical matter from the standpoint of commercial availability of the starting raw materials.

H is a hydrogen radical located only in the positions meta to the OH radical on the benzene ring. Either or both of the meta positions relative to the OH radical can have hydrogen substitution and hence $a$ is a number from 1 to 2.

X is a chloro, bromo or iodo radical which can be substituted on one or both of the ortho positions, on the para position, and on one of the meta positions relative to the hydroxyl radical. Since there must always be present at least one organic radical, "R" and one hydrogen radical, there can be at most three of the X radicals, and thus $b$ equals a number from 1 to 3.

Likewise, the monovalent hydrocarbon radical R can be substituted in one or both of the ortho positions, in a meta position, or in the para position; but because of the requirement that there be at least one hydrogen radical and at least one chloro, iodo or bromo radical also present on the benzene ring, there can never be more than three organic radicals present on the benzene ring and thus $c$ is a number from 1 to 3.

In summary, the substituted phenols of this invention will have at least one hydrogen radical in a meta position, at least one X radical as above designated, and at least one hydrocarbon radical "R." The remaining positions may be substituted with the same or different members of the group consisting of a hydrogen, halogen or hydrocarbon radical, hydrogen being substitutable only in the remaining meta position. Thus the sum of *a*, *b*, and *c* in the above formula will always equal 5.

Specific examples of some of the substituted phenol monomers which fall within the foregoing description and are useful for the improved polymerization process of this invention are 2,6-dimethyl-4-bromo phenol; 2,6-diethyl-4-bromo phenol; 2,6-diallyl-4-bromo phenol; 2,3,6 - trimethyl - 4 - bromo phenol; 2,3,6-tri-n-butyl-4-chloro phenol; 2,6 - dimethyl - 4 - chloro phenol; 2,6-hexadecyl-4-bromo phenol; 2,4-dioctyl-6-bromo phenol; 2,6-dimethyl-3-allyl-4-bromo phenol; 2-phenyl-6-methyl-4-chloro phenol; 2-methyl-6-allyl-4-chloro phenol; 2-methyl-6-allyl-4-bromo phenol; 2,4,6-trichloro-3-methyl phenol; 2,4,6-tribromo-3-ethyl phenol; and the like. Still other monovalent hydrocarbon substituted phenols having at least one iodo, bromo or chloro group and at least one meta hydrogen radical can be used. Of the various monomers contemplated herein, it is preferred to employ either a monochlorophenol or a monobromophenol having two to three monovalent, hydrocarbon radicals as previously defined, and containing from 1 to 18 carbon atoms.

When practicing the present invention, the halogen-hydrocarbon substituted phenols are polymerized by means of an iodine catalyst in comminuted solid form or dissolved in an inert diluent, as will be more fully described hereinafter. The iodine catalyst is added rapidly (i.e., substantially instantaneously) to the reaction mixture, subsequent to the mercuric oxide promoter addition, in amounts ranging from 0.01 mole to 0.5 mole per mole of phenol. It is especially advantageous to use 0.1 to 0.5 mole iodine per mole of phenol although amounts without these ranges may be used without affecting the reaciton. The term "mole" is herein used to described iodine, refers to $I_2$ or 2 gram-atoms of iodine.

The use of mercuric oxide as a polymerization promoter, in combination with iodine catalyst, has, surprisingly, been found to markedly increase the molecular weight of the resulting polymer. The advantages of the invention are evident when the amount of promoter added is at least about 0.0005 mole per mole of monomer, preferably, at least about 0.01 mole or promoter per mole of phenol monomer. The upper limit of promoter may be as high as 0.5 mole per mole of monomer, but higher amounts are limited by economic considerations.

To achieve the exceptional results of the invention a two-phase liquid polymerization medium is used. The first phase is a polar liquid such as methanol, ethanol, or preferably water, whereas the second phase is an organic liquid such as benzene, toluene, chloroform or the like, which is substantially immiscible with the first polar phase, but is a solvent for the polyphenylene ether product formed. There may be employed additionally an emulsifying agent to aid in the intermingling of the two phases, although this is optional.

Polymerization is conducted under alkaline conditions. That is, at a minimum pH of 7.0. Alkaline materials which are partially soluble in the polymerization media are used to provide and maintain the alkaline pH. Examples of desirabile alkaline materials are bases such as potassium hydroxide, sodium hydroxide, ammonium hydroxide, quaternary ammonium compounds, magnesium hydroxide and the like, as well as salts of strong bases and weak acids such as sodium carbonate, potassium carbonate, etc. During polymerization there must be present at least one equivalent of the alkaline material for each mole of phenol monomer to be polymerized. It is preferred, however, to use an excess of the alkaline material.

The polymerization is conducted, generally at ambient temperatures and pressures although lower and higher temperatures and pressures may be used. Polymerization reaction times vary, depending upon the temperatures, from a few seconds to a few hours and will normally be completed in from about 10 to 60 minutes.

The polymerization reaction mixtures containing the halogen-hydrocarbon substituted phenol monomer solution is agitated during the course of polymerization, preferably by stirring. With the two-phase polymerization used, best results are obtained with vigorous agitation, such as with the use of a high speed impeller so as to give the most intimate mixing of the reaction mixture.

The halogen-hydrocarbon substituted phenol monomers utilized in the improved process of the present invention, are conveniently prepared, for instance by the halogenation of the corresponding alkylphenols. A typical method for the preparation of the alkyl phenols is described in U.S. Patent No. 2,831,898, entitled, "Phenol Alkylation Process," to George G. Ecke et al., filed Apr. 29, 1954.

Such alkylphenol compounds are, for example, advantageously brominated and/or especially chlorinated directly with or without halogenation catalysts by procedures well-known in organic chemistry. Chlorination, bromination or iodination is advantageously achieved utilizing the element per se, hydrogen halides, sulfuryl halides, etc. In the case of introducing iodine into the alkylated phenol structure in aqueous solution of ammonium iodide or an alcoholic solution of iodine also may be used. When 2,6-alkylphenols are thus halogenated, the halogen preferentially enters the desired para position when proper conditions, well-known in the art, are employed.

The improved polymerization process of this invention may utilize only one halogen-substituted phenol monomer or it may employ a plurality of different halogen-hydrocarbon substituted phenols as monomers, which are encompassed within the description given hereinbefore. Where several different halogen-hydrocarbon substituted phenols are employed as monomers, they may be added to the polymerization reaction in such order as to give a final polymer of high intrinsic viscosity which may contain an alternate, random, or block arrangement of monomer units.

The molecular weight of the hydrocarbon substituted polyphenylene ether polymers, produced by the improved polymerization process of the invention, generally varies from 5,000 to 300,000 and exists in the solid state. Such solid polymers have an improved inherent viscosity ranging from 0.1 to 1.0, or from about 25% to 75% improvement, over the known method of polymerizing by the use of iodine catalyst alone. As an example, when the monomer is 4-chloro-2,6-dimethyl phenol, the inherent viscosity may range from about 0.4 to 1.0 when utilizing only iodine catalysts in the polymerization; wherein when mercuric oxide is utilized as a polymerization promoter with the iodine catalyst the range of inherent viscosity is from about 0.7 to 1.4.

The polymer produced by this invention has application as thermo-plastic or as thermo-setting resin. The polymers, as before set out, are normally utilized by dissolving the improved polymers in appropriate solvents. The resulting solutions can be used as coatings and adhesives, for fabric, wood, paper, metal and glass substrates etc. When polyphenylene ethers produced by the method of the invention contain unsaturated hydrocarbon substituents, they may be cross-linked by heating to elevated temperatures (e.g. 150° C.) for short periods of time (e.g. 10 minutes) with or without added crosslinking agents such as for example divinyl benzene, etc. to give strong manufactured articles of commerce. Also, thin coatings of these polymers may be cross-linked at ambient temperatures and compounded with driers, such as cobalt naphthenate, and catalysts and exposed to air.

The invention will be best understood with reference to the following examples which are given for purposes

EXAMPLE I

Twenty grams (0.1 mole) of 4-bromo-2,6-dimethyl phenol and 12 grams (0.2 mole) of KOH are dissolved in 100 cc. of water with agitation in a polymerization reactor. 100 cc. of benzene and 1.2 grams of emulsifier, Igepal CO-630, are added and the mixture again agitated while 400 cc./min. of air are passed through the mixture. To the mixture is added 12 grams (0.05 mole) of iodine crystals as the catalyst. The mixture is agitated for 30 minutes at 25° C. A dark, brown, viscous layer of benzene and polymer is formed over a water layer. Because the polymer and benzene mixture is so viscous, the water is easily decanted from the polymer and benzene mixture. The polymer is precipitated from the benzene with methanol, filtered and redissolved in 500 cc. of benzene. The polymer solution is filtered through glass wool, reprecipitated with methanol and dried in a vacuum oven at 60° C. The yield is 70 percent. The resulting polymer is found to have an inherent viscosity of 1.3 dl./g. in chloroform at 25° C.

EXAMPLE II

To the same quantities of benzene and water containing 1.5 grams of the emulsifier Igepal CIO-630 are added 20 grams (0.1 mole) of 4-bromo-2,6-dimethyl phenol, 12 grams (0.2 mole) of KOH and 2.1 grams (0.01 mole) of mercuric oxide promoter followed by ten minutes of agitation. To the mixture is then added eight grams (0.03 mole) of iodine catalyst. The polymer is formed immediately with the water layer separating from the benzene and polymer layer. The reaction mixture is agitated for 30 minutes. The resulting polymer is recovered and purified as described in Example I. The yield is 80 percent. The polymer has an inherent viscosity of 2.3 dl./g. in chloroform at 25° C.

This example shows that a polymer of improved molecular weight is formed, as is evidenced by the improved inherent viscosity, when mercuric oxide promoter is utilized to polymerize the phenol monomer, which promoter also allows a reduction in the amount of iodine catalyst.

Obviously, modifications and variations of the present invention may be made without departing from the spirit and scope thereof, and it is intended that the invention be construed and intepreted to include manifest equivalents thereto as is provided in the appended claims.

What is claimed is:

1. In the process of producing hydrocarbon substituted polyphenylene ethers by the polymerization of substituted-phenols of the general formula:

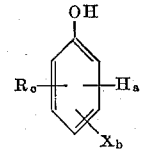

where X is a substituent selected from the group consisting of chloro, bromo and iodo radicals, H is a hydrogen radical located only on the meta positions relative to the OH radical, R is a monovalent hydrocarbon radical which when substituted in the two ortho positions relative to the OH radical must have one of said hydrocarbon radicals attached to the benzene ring by a carbon atom which is bonded to at least two hydrogen atoms; $a$ equals a number from 1 to 2, $b$ equals a number from 1 to 3, and $c$ equals a number from 1 to 3 and the sum of $a$, $b$, and $c$ equals 5, with an iodine catalyst, the improvement which comprises conducting the polymerization in the presence of mercuric oxide.

2. The process of claim 1 wherein the polymerization is conducted in an alkaline polymerization medium with a minimum pH of at least about 7.0.

3. The process of claim 2 wherein the polymerization is conducted in a two-phase polymerization medium.

4. The process of claim 3 wherein one-phase of the polymerization medium is water.

5. The process of claim 1 wherein the substituted phenol is a 4-halo-2,6-dihydrocarbylphenol.

6. The process of claim 1 wherein the substituted phenol is 4-bromo-2,6-dihydrocarbylphenol.

No references cited.

WILLIAM H. SHORT, *Primary Examiner.*

M. GOLDSTEIN, *Assistant Examiner.*